United States Patent [19]

Bey et al.

[11] 3,744,916
[45] July 10, 1973

[54] OPTICAL FILM THICKNESS MONITOR

[75] Inventors: Paul B. Bey, Temple Hills; Raymond A. Patten, Oxon Hill, both of Md.

[73] Assignee: The United States of America as represented by the Secretary of the Navy, Washington, D.C.

[22] Filed: June 8, 1971

[21] Appl. No.: 151,049

[52] U.S. Cl. ............... 356/161, 250/219 TH, 118/9
[51] Int. Cl. ............................................. G01b 11/00
[58] Field of Search ...................... 356/161, 95, 100; 250/219 TH; 118/9

[56] References Cited
UNITED STATES PATENTS

| 3,645,623 | 2/1972 | Patten ...................... 250/219 TH X |
| 3,017,512 | 1/1962 | Wolbert ............................... 356/161 |
| 3,439,175 | 4/1969 | Kammuller et al. ................ 356/161 |
| 3,238,839 | 3/1966 | Day, Jr. ......................... 250/219 TH |
| 3,322,962 | 5/1967 | Muller ................................ 356/161 |
| 2,973,686 | 3/1961 | Dreyfus et al. ................ 250/219 TH |

OTHER PUBLICATIONS

Pliskin et al., "Alternating Wavelength Vampo", IBM Tech. Disclosure Bul. Vol. 13, No. 3, 8/70

Primary Examiner—Ronald L. Wibert
Assistant Examiner—Paul K. Godwin
Attorney—R. S. Sciascia, Arthur L. Branning and Philip Schneider

[57] ABSTRACT

Apparatus for measuring the optical thickness of a thin film on a substrate by utilizing two light beams of different wavelengths. The beams are chopped into a series of time-alternating pulses, passed through the film and substrate and detected to provide an electrical pulse output. Alternate pulses are then subtracted from each other and the differences are averaged. A null occurs whenever the optical film thickness is at integral quarter-wavelengths of the average wavelength of the two light beams.

3 Claims, 4 Drawing Figures

Patented July 10, 1973

INVENTORS
PAUL P. BEY
RAYMOND A. PATTEN

ATTORNEYS

OPTICAL FILM THICKNESS MONITOR

BACKGROUND OF THE INVENTION

This invention relates to a method and means for measuring the optical thickness of thin films.

Recent advances in modern optics have placed added emphasis on the techniques of optical thin-film preparation. A primary requirement in a variety of applications is that the thickness of the films be accurately determined and the determination is obtained by the employment of an optical thickness-monitoring system. However, such equipment varies to a considerable extent in actual ability to provide accurate thickness determinations.

SUMMARY OF THE INVENTION

This invention measures the optical thickness of a thin film by subtracting the intensities of two light beams of different wavelengths which pass through or are reflected by the film. When the film is an integral number of quarter-wavelengths of the average wavelength of the two beams, the intensities are equal and a null is obtained. A preliminary calculation utilizing the refractive index of the film, and the average wavelength of the light beams provides the number of nulls to be expected for the film thickness which is desired. By counting this number of nulls as the film is deposited, the deposition of film can be stopped when the correct thickness is obtained in terms of the null count.

An object of this invention is to measure accurately the thickness of thin films.

Another object is to accurately measure the thickness of thin films and to do so by optical means in a non-destructive manner.

Other objects, advantages and novel features of the invention will become apparent from the following detailed description of the invention when considered in conjunction with the accompanying drawings wherein.

DETAILED DESCRIPTION OF THE INVENTION

Figure 2:
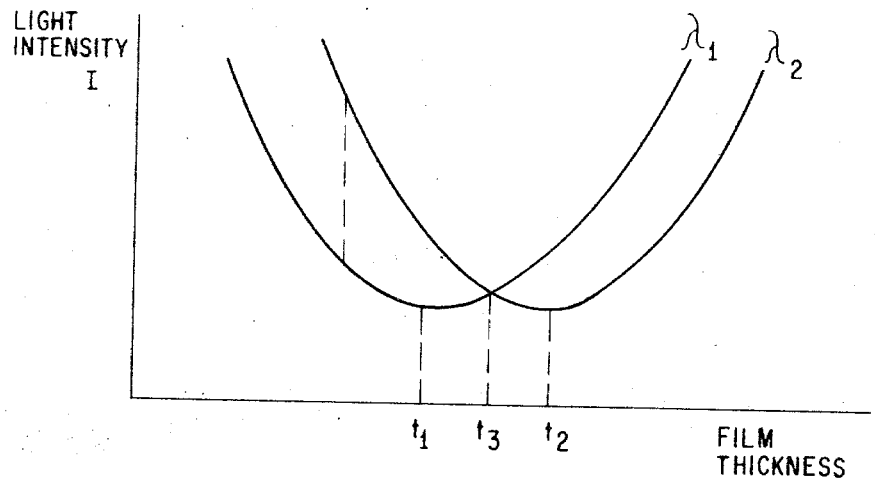
FIG. 2 is a graph showing the variation of the light intensity of a light beam passed through a thin film with the thickness of the film.

As can be seen from FIG. 2, if $_1$, light beam of wavelength $\lambda$, is passed through a thin film, such as a zinc sulphide deposit on a substrate, the light intensity varies with the thickness of the film, coming to a minimum at some value of film thickness, $t_1$. If the light is of a different wavelength, $\lambda_2$, the minimum intensity occurs at a different thickness, $t_2$. However, because of the nature of the curves, a crossover point occurs at some intermediate thickness, $t_3$.

Figure 1:
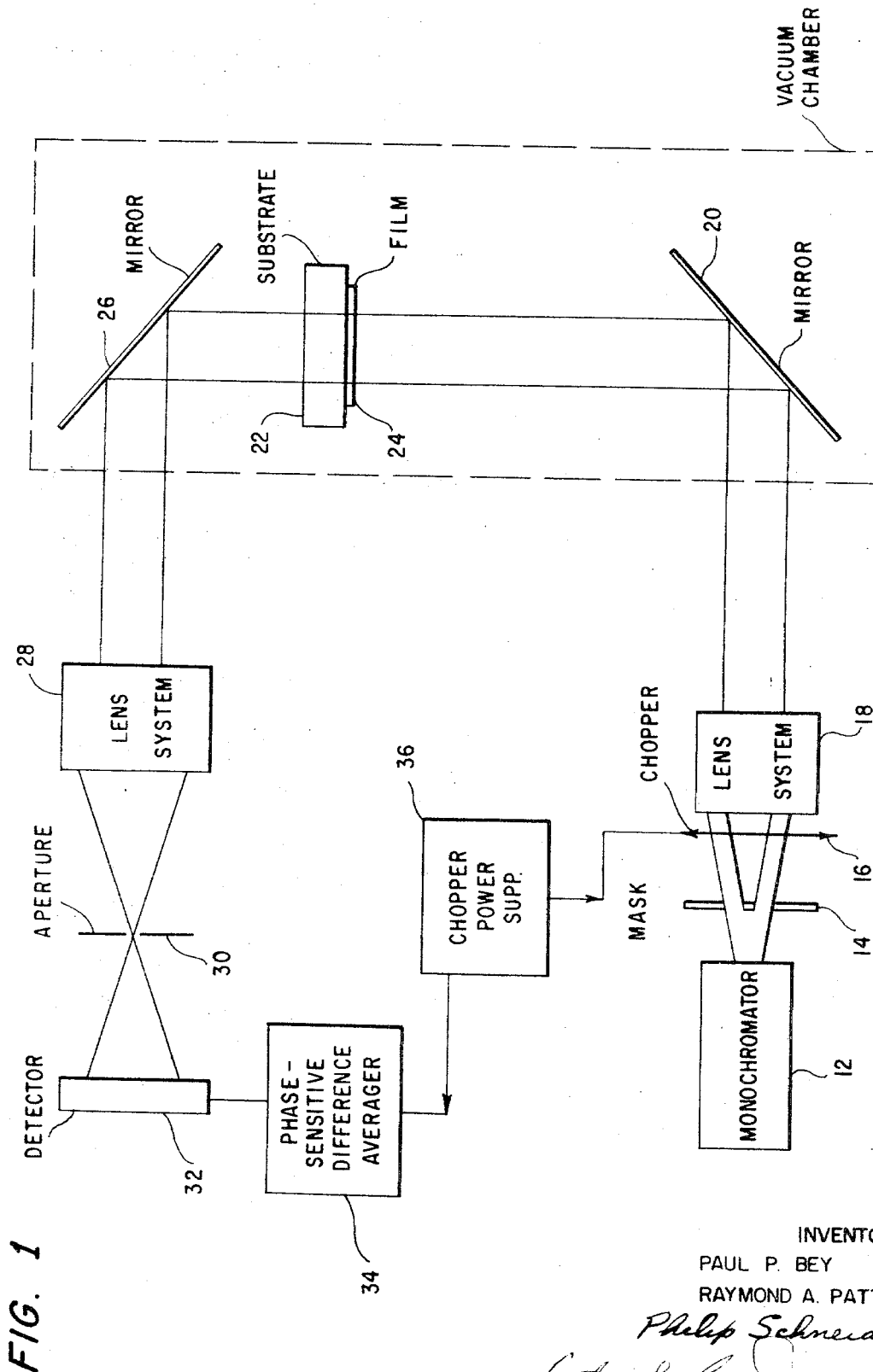
FIG. 1 is a schematic illustration of an embodiment of the invention.
Figure 3:
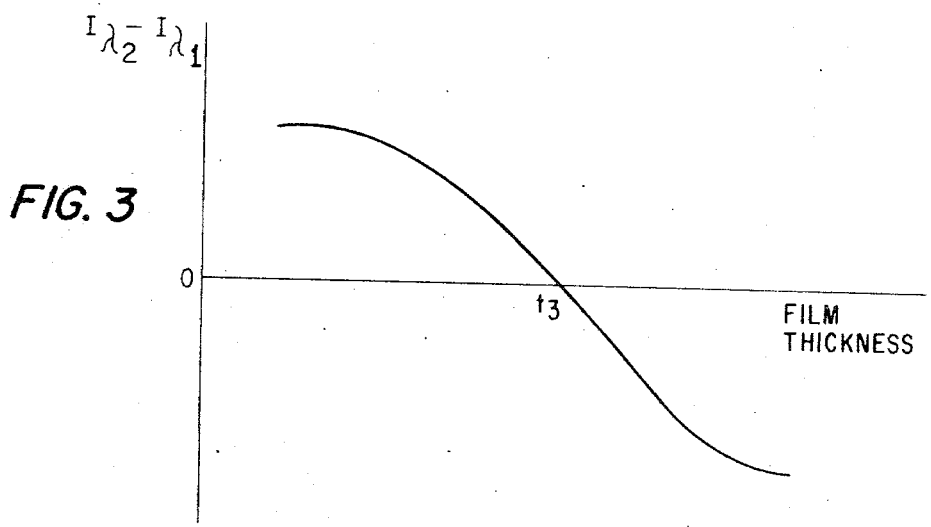
FIG. 3 is a graph showing the variation of the differences in light intensity of two beams of different wavelengths which have been passed through the film.

If the light intensities are subtracted from each other, the curve shown in FIG. 3 is obtained and it is clear that a zero differential intensity, or null point, is obtained at $t_3$. This null occurs at integral numbers of optical quarter-wavelength of the average of $\lambda_1$ and $\lambda_2$, that is, it occurs at $n \frac{1}{4} (\lambda_1 + \lambda_2/2)$, where $n$ is any integer greater than 0. FIG. 1 shows an embodiment of the invention. A monochromator 12, which is a device having an output which is a beam of light whose wavelength varies across the beam, projects light through a mask 14 and a chopper 16 into a collimating lens system 18. The mask 14 allows only two parts of the monochromator beam, each centered at a different wavelength (e.g., $\lambda_1$ and $\lambda_2$) to pass. Thus, for a Bausch and Lomb high-intensity-grating monochromator and a particular mask, and for a center setting of the monochromator wavelength of 5,000A, the two beams peaked at 5,050 and 4,950 A and were each 100 A wide. An alternative light source might be a white-light source and a circular interference filter.

The two beams then fall on a chopper, or interrupter, 16, the chopper (for example, an American Time Products tuning-fork chopper) alternatly interrupting each light beam so that each beam consists of a series of spaced pulses, the pulses of one beam occurring during the spacing periods of the other. A useful chopper frequency might be about 150 Hz, for instance. The two pulsed beams now pass through a lens system 18 which collimates the beams.

The beams are projected into the film deposition chamber and are reflected from a first mirror 20 through the film 24 and its substrate 22 onto another mirror 26 which reflects the beams out of the vacuum chamber. (If the substrate 22 is opaque, then the light beams will be reflected therefrom. The invention works in either case.)

The beams are then passed through a lens system 28 which gathers and focuses the light, and an aperture 30 which reduces the field of view so that only light from the monochromator 12 falls on the light detector 32. The light detector 32 is a device which provides an electrical output proportional to the intensiy of the light falling upon it. A photomultiplier can be used, for example.

Figure 4:
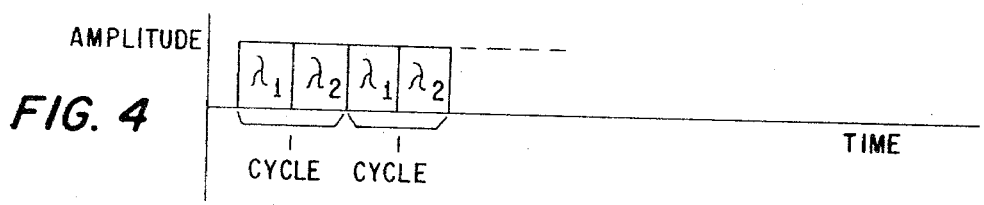
FIG. 4 is an illustration of the pulses in the output of the light detector, plotting amplitude against time.

The electrical output of the detector 32 is fed to subtraction-and-averaging means 34, such as the Princeton Applied Research phase-sensitive detector, Model HR–8. The electrical output of the detector is shown in FIG. 4 — it consists of pulses. Each cycle comprises two pulses, one resulting from the beam of wavelength $\lambda_1$ and the other from the beam of wavelength $\lambda_2$. (There may be a space between the pulses, depending on the operation of the chopper.) The subtraction-and-averaging means 34 subtracts each two pulses in one cycle, averages the differences and displays the result on an indicating device, such as a voltage meter. The means 34 is synchronized with the light-beam pulses by an input from the power supply 36 which energizes the chopper 16, usually a sine wave generator.

To obtain a given physical film thickness, knowing the refractive index of the film, the following relations are used:

1. $T = k t$
2. $N = 4T/\lambda_o$ where $T =$ the optical thickness of the film
 $k =$ the refractive index of the film
 $t =$ the physical thickness of the film
 $N =$ the number of quarter-wavelengths (or the number of nulls)
 $\lambda_o =$ the average wavelength of the two light beams that are used.

$t$, $k$ and $\lambda_o$ are known, so that the number of nulls which must occur to give a given optical, and therefore physical, film thickness can be calculated. These can be determined by watching the indicating instrument or by hooking the subtraction-and-averaging means output to electronic counting means. If the number, $N$, does not work out to be an integer, and accuracy is required, the average or center wavelength, $\lambda_o$, of the monochromator can be varied to provide a wavelength which will result in $N$ being an integer.

Although only a preset thickness is indicated by the null signal, a wide range of thicknesses is obtainable because the center wavelength of the monochromator is easily varied. The method herein is independent of any variation of detector sensitivity with wavelength, or of any characteristics of the substrate. If the two beams have different intensities, various methods can be utilized to equalize the detector outputs. All these factors, if they exist, may be eliminated by the zero offset on the subtraction-and-averaging means before film deposition begins. As the film thickness starts to grow, the indicator on this instrument reads off null, and passes through the same null point every time a maximum or minimum in the transmission or reflection is encountered.

The means and the method can be used whether the substrate is light transmissive or opaque since it will work whether the light beams are transmitted through the substrate and film or reflected therefrom. It will even work on relfected light from a film which is deposited on a light-transmissive substrate since, even here, there is some reflection.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An optical film thickness measuring device for measuring the thickness of a thin film deposited on a substrate surface comprising, in combination:
    means for providing two light beams of different wavelengths, each beam exhibiting a varying curve of light intensity vs. film thickness when passed through said film, each said curve having alternate maximum and minimum points and one said curve being displaced from the other so that crossover points occur at thicknesses of said film which vary by one-quarter of the average wavelength between said beams;
    means for alternately interrupting each light beam so that the light beams comprise a series of alternate pulses with respect to time;
    means for collimating said interrupted light beams;
    means for projecting said interrupted light beams upon said film and substrate;
    means for collecting the light after it has passed through or been reflected from said film and substrate and focusing the transmitted or reflected light beams,
    said light beams being passed through said substrate if it is light-transmissive and being reflected therefrom if it is opaque;
    means for detecting said transmitted or reflected light beams, and providing an electrical output in accordance with its intensity;
    means connected to said detection means for subtracting alternate pulses from each other and for averaging the differences; and
    means connected to said subtraction-and-averaging means for providing an indication of the averaged differences.

2. A device as in claim 1, wherein
    said means for providing two light beams comprises a monochromator and a two-hole mask, and
    said subtraction-and-averaging means comprises a phase-sensitive detector.

3. A method for measuring the thickness of a thin film deposited on a substrate surface comprising the steps of:
    alternately interrupting two light beams of different wavelengths so that the beams form two series of light pulses, those in one series occurring during the spaces in the other series and vice versa;
    projecting these pulsed beams in parallel disposition upon said film and substrate;
    focusing the pulsed beams, which are transmitted or reflected by said substrate depending respectively on whether the substrate is light-transmissive or light-reflective, upon light-detecting means providing an electrical output proportional to light intensity;
    subtracting alternate pulses of said electrical output from each other and averaging the differences; and
    utilizing the null points in the averaged differences to indicate the thickness of the deposited film.

* * * * *